United States Patent [19]

Torok et al.

[11] 4,317,748

[45] Mar. 2, 1982

[54] PROCESS FOR THE PREPARATION OF SUPPORTED NICKEL CATALYSTS

[75] Inventors: John Torok, Deep River; Eugene F. McCaffrey, Mississauga; Roland H. Riem, Oakville; Wing S. Cheung, Toronto, all of Canada

[73] Assignee: Emery Industries, Inc., Cincinnati, Ohio

[21] Appl. No.: 200,181

[22] Filed: Oct. 24, 1980

[30] Foreign Application Priority Data

Dec. 12, 1979 [CA] Canada ............................. 341686

[51] Int. Cl.³ ............................................. B01J 23/74
[52] U.S. Cl. .................................................. 252/472
[58] Field of Search .................... 252/447, 459, 446 J, 252/472

[56] References Cited

U.S. PATENT DOCUMENTS 3,207,702  9/1965  Flank et al. ..................... 252/459 X
4,142,962  3/1979  Yates et al. ..................... 252/466 J

*Primary Examiner*—W. J. Shine
*Attorney, Agent, or Firm*—Kenneth D. Tremain

[57] ABSTRACT

Highly effective supported nickel catalysts having finely divided metallic nickel deposited thereon and high specific metal surface areas are obtained by a process wherein a support material is contacted with a nickel soap in an inert hydrocarbon and the resulting nickel-bearing support subsequently subjected to a sulfiding step followed by reductive treatment. The present catalyst compositions are useful as hydrogenation catalysts, particularly for the hydrogenation of fatty materials.

8 Claims, No Drawings

PROCESS FOR THE PREPARATION OF SUPPORTED NICKEL CATALYSTS

BACKGROUND OF THE INVENTION

Supported metal catalysts are known and their use in numerous reactions, including the hydrogenation of fatty materials, has been described extensively in the literature. To obtain acceptable catalyst activity for applications involving the hydrogenation of fats, oils and their derivatives, the catalyst should have a high specific metal surface area (metal surface per unit weight of catalyst).

While many methods have been described to effect deposition of metals on support materials, they are not totally satisfactory for the preparation of high surface area supported nickel catalysts. For example, in a common procedure nickel is precipitated on the support in the form of an insoluble oxide, hydroxide, carbonate or the like. It is customary to effect this precipitation at elevated temperatures in the presence of a basic compound, such as alkali hydroxide. As a result of this exposure to the hot alkaline solution significant changes in the surface structure of the support occur. Even when it is possible to effect deposition of nickel oxide or hydroxide on the support without significantly altering the pure structure of the support, subsequent reduction with hydrogen has required temperatures upwards of 400° C. and at these temperatures substantial sintering (coalescing) of the nickel occurs. In either case, the specific surface area of the resulting catalyst is appreciably reduced and the effectiveness of the catalyst for hydrogenation applications is significantly lessened.

It would be highly advantageous if a process were available whereby highly effective supported nickel catalysts useful for the hydrogenation of fatty materials could be prepared. It would be even more desirable and advantageous if conditions employed for the process were such that (a) high specific surface area catalysts could be obtained, (b) the surface and pore structure of the support were not significantly altered during the catalyst preparation, and (c) very fine particles of nickel were uniformly deposited over the entire surface of the support. These and other advantages are realized with the process of the present invention and the improved supported nickel catalysts obtained thereby.

SUMMARY OF THE INVENTION

The present invention relates to highly useful supported nickel catalysts having finely divided metallic nickel deposited thereon and to the process for the preparation of these improved catalysts. The supported catalysts are very effective for the hydrogenation of fats and oils. Typically they are free-flowing powders containing from 25 to 75 percent nickel having small crystallite size. The total surface area of the catalysts will range from 100-800 m²/g while the nickel surface area is from 25-100 m²/g.

To obtain the above catalysts a suitable inorganic support material having a surface area of 100 m²/g to 800 m²/g is contacted at a temperature in the range 0° C. to 250° C. with a nickel soap of a $C_{2-22}$ aliphatic monocarboxylic acid in an inert liquid hydrocarbon until the nickel is adsorbed on the support. Preferably the nickel soap will be derived from a $C_{6-18}$ secondary or tertiary saturated aliphatic monocarboxylic acid, the hydrocarbon is a saturated aliphatic hydrocarbon having a boiling point greater than 90° C. and the temperature of contact is between 20° C. and 100° C. When essentially all of the nickel is associated with the support, generally up to a maximum of 3.5 wt. % nickel, the nickel-bearing support is subjected to a sulfiding operation which consists of contacting with hydrogen sulfide at a temperature of 0°-200° C. and, more usually, 5° C. to 100° C. to convert the nickel on the support to nickel sulfide. Generally, from about 10% to about 50% of the nickel is converted to nickel sulfide before the final step in the catalyst preparation, the reductive treatment, is begun. For the reduction the catalyst is treated with hydrogen at a temperature from about 100° C. to 200° C. at a pressure of 10 to 500 psig in the presence of additional nickel soaps. The amount of nickel soap employed is calculated to obtain the desired weight level of metallic nickel on the catalyst. Preferably, the reductive treatment with be carried out in the presence of 2.5 to 25 wt. percent (based on the dry weight of the support) of a reduction promoter, preferably hydroquinones, anthraquinones and naphthoquinones.

DETAILED DESCRIPTION

The present invention relates to a process for preparing supported nickel catalysts and for the improved catalyst compositions obtained thereby. The products of this invention have utility in numerous applications, however, they are particularly useful as hydrogenation catalysts especially for the hydrogenation of fatty materials. In its most general terms, the present process involves contacting a solid support material and nickel soap of a monocarboxylic acid in an inert hydrocarbon until the nickel is associated with the support. The nickel-bearing support material is then subjected to a sulfiding step followed by precipitation of nickel metal thereon. Employing this procedure, highly useful and effective supported nickel hydrogenation catalysts having high specific metal surface areas are obtained.

The use of an inert hydrocarbon is an essential feature of the present process for the preparation of the improved supported nickel catalysts. Aliphatic hydrocarbons are the preferred medium in which the nickel soap and support material are dispersed and contacted. Especially useful for this purpose are saturated aliphatic hydrocarbons having from about 7 to 40 carbon atoms per molecule and which have boiling points greater than about 90° C. Products of this type are conveniently obtained by the fractional distillation of a paraffin based petroleum fractions and include normal paraffins ($C_nH_{2n+2}$), isoparaffins ($C_nH_{2n+2}$), cycloparaffins ($C_nH_{2n}$) and most usually will consist of mixtures thereof. Especially useful hydrocarbons of the above type typically consist of mixtures of oily liquid hydrocarbons in the range $C_{8-32}$. Since aromatic hydrocarbons seem to interfere with the ability of the nickel to associate with the support and since olefinic hydrocarbons can lead to the formation of undesirable by-products, they are less desirable than the saturated aliphatic hydrocarbons. If aromatic or olefinic materials are present they generally will constitute less than 25% by weight of the hydrocarbon medium and more preferably will be present in amounts less than 10% by weight. Most preferably in the practice of this invention the inert hydrocarbons are liquids at 0° C. and boil in the range 100° C. to about 350° C. Especially preferred aliphatic hydrocarbons particularly useful for this process include, but are not limited to, the mineral oils and mineral seal oils, liquid petrolatum and liquid paraffin.

Nickel soaps useful in the process of this invention are derived from aliphatic monocarboxylic acids having from about 2 to about 22 carbon atoms. Useful carboxylic acids for the formation of the nickel soaps include acetic acid, propionic acid, butyric acid, pentanoic acid, hexanoic acid, heptanoic acid, 2-ethylhexoic acid, pelargonic acid, capric acid, n-undecylic acid, lauric acid, n-tridecyclic acid, myristic acid, palmitic acid, stearic acid and isostearic acid. Preferably, the aliphatic carboxylic acids are secondary or tertiary saturated monocarboxylic acids, i.e. having the carbon atom in the alpha position substituted with one or two alkyl groups, respectively, and contain from about 6 to about 18 carbon atoms. Especially useful acids of this type include neodecanoic acid and commercially available $C_{9-16}$ tertiary acids and mixtures thereof (e.g. Versatic acids). Metallic soaps of these acids are known and the nickel soaps useful for this invention can be obtained utilizing conventional procedures known to the art. In addition to the aforementioned saturated monocarboxylic acids, unsaturated fatty acids such as oleic acid and linoleic acid or mixtures thereof (e.g. tall oil fatty acids) linolenic acid or the like can be used in the process of this invention. Also, mixtures of saturated and unsaturated acids, such as are obtained from animal and vegetable fats and oils, can be advantageously employed. While the aforementioned nickel soaps are especially useful for the invention other organo nickel complexes which exhibit some solubility in inert hydrocarbons can also be used.

To obtain the highly active nickel catalysts of this invention, support materials having surface areas greater than about 50 $m^2/g$ (determined by the BET method) are required. The support materials are preferably solid inorganic mineral supports having surface areas between about 100 $m^2/g$ and 800 $m^2/g$ and while preferably in the form of a powder, they can also be in the shape of spheres, hollow tubes, rings, fibers, platelets or the like. Synthetic inorganic oxides of silicon, magnesium, calcium, aluminum, zinc and mixtures thereof can be used as the support material. Alumina, silica, silica gel, fumed silica, naturally occurring clays, such as montmorillonite and montmorillonite-rich minerals, carbon black, activated charcoal and the like are particularly useful for the present invention. The various supports may be used as such or can be activated, such as by treatment with alkali, prior to use.

One of the advantages of this process is that the surface and internal structure of the support material are not significantly altered during the catalyst preparation. This is the result of the extremely mild conditions employed throughout the process, primarily, the absence of caustic and the significantly lower temperatures used in the reductive step. The use of the inert hydrocarbon for the process and the generation of initiation (nucleation) sites on the support prior to deposition of the bulk of the nickel metal make it possible to employ such mild conditions while still achieving a highly effective and useful catalyst.

In the first step of the process for the preparation of the improved catalysts of this invention the support material is contacted with a small amount of the nickel soap in the inert aliphatic hydrocarbon medium until essentially all of the nickel is associated with the support. The resulting product, referred to as the nickel-bearing support, is distinguished from the final supported nickel catalyst. The nickel soap is primarily adsorbed on the surface of the support, however, some exchange may occur between the cations of the support. It is also possible for nickel to react with the surface hydroxyl groups of the support and to be covalently bonded to the support through bridging oxygen linkages. In the presence of water hydrolysis of the nickel soap can occur and nickel hydroxide formed which can deposit on the support surface. For the purpose of this invention when it is indicated that the nickel is associated with the support, it is intended that all of the above types of reactions are encompassed. The extent to which each of these reactions occurs is not known nor is it critical and is governed primarily by the particular support, hydrocarbon and nickel soap used and time/temperature considerations. As long as the nickel soap and support are contacted in the prescribed manner, as will be detailed more fully below, acceptable results are obtained.

Contact between the nickel soap and support material can be accomplished in a variety of ways. The nickel carboxylate can be dissolved or dispersed in the hydrocarbon and the support added thereon or the nickel soap can be added to a hydrocarbon/support dispersion. The resulting mixture is agitated until essentially all of the nickel is associated with the support. This is easily ascertained by observing the color change of the solution—it will become colorless, or essentially so, as the nickel soap is adsorbed. The time required for this step of the operation will vary depending on the concentration of the nickel soap and other conditions. Temperatures can range from about 0° C. up to about 250° C. during the contact of the nickel soap and support. Most usually, however, the temperature will range between 20° C. and 100° C. When operating within these limits, adsorption of the nickel on the support will usually be complete within about twenty minutes, however, longer contact times can be maintained with no detrimental results. From about 0.1 wt. % to about 50 wt.% support material can be dispersed in the hydrocarbon and the amount of nickel soap employed will be such that about 0.01 to about 3.5 wt. %, and more preferably 1.0 to 2.75 wt. % nickel is associated with the support. At the higher nickel levels and/or when a significant excess of the nickel soap is utilized, it may be advantageous to filter and wash the nickel-bearing support prior to the sulfiding operation.

In the sulfiding step the nickel-bearing support is contacted with hydrogen sulfide gas to convert all or a portion of the nickel associated therewith to nickel sulfide. The sulfiding operation is also carried out in an inert hydrocarbon medium of the type described above. Hydrogen sulfide can be introduced directly to the slurry (dispersion) obtained from the previous step or the nickel-bearing support can be recovered, by filtration or the like, prior to the sulfiding operation. If the latter procedure is employed the nickel-bearing support will typically be solvent washed several times. It can then be re-slurried in an inert aliphatic hydrocarbon, which can be the same or different than used in the first step of the catalyst preparation, and treated with hydrogen sulfide. The ratio of nickel-bearing support to hydrocarbon can be the same or different than the support:hydrocarbon ratio employed for the previous step. If desired, the nickel-bearing support can be stored for extended periods to sulfiding.

Generally, the sulfiding operation will be carried out at a temperature between about 0° C. and 200° C. and, more preferably, between about 5° C. and 100° C. In the usual practice of this invention an amount of hydrogen sulfide calculated to convert the desired amount of nickel to nickel sulfide is introduced into a vessel and intimately contacted with the nickel-bearing support. The hydrogen sulfide can be conveniently charged in admixture with one or more other inert gases, such as nitrogen, helium, argon, etc., however, for best results oxygen should be excluded. Contact is usually accomplished by agitation using a suitable stirrer or rocking assembly or similar means. The gas is preferably introduced subsurfacely with vigorous agitation. Unreacted hydrogen sulfide may be recycled. While all of the nickel present on the support at this stage of the operation can be converted to nickel sulfide during the sulfiding step, greater than 1% and more usually from about 5% to 70% conversion to nickel is sufficient. It is most advantageous, however, to convert from 10% to 50% of the associated nickel to nickel sulfide and an amount of hydrogen sulfide calculated to achieve conversion within this range will therefore generally be used.

Upon completion of the sulfiding operation, the support having nickel sulfide thereon and maintained in the inert hydrocarbon medium is subjected to a reductive treatment in the presence of a nickel soap. In this final step in the process, finely divided metallic nickel is deposited on the support to obtain the highly active supported nickel catalyst. The nickel sulfide is believed to function as initiation or nucleation sites for the deposition of the metallic nickel so that reduction and deposition can be achieved employing milder conditions than were heretofore possible. Thus the internal and external structure of the support are not adversely affected and uniform deposition of finely divided metallic nickel is achieved with the result that an extremely effective high specific surface area catalyst is obtained.

In the reductive treatment step, the same as with the previous operations, the sulfided support can be used directly as obtained from the preceding step or it can be isolated by filtration or by allowing the slurry to settle and removing the supernatant liquid by decantation. It can be stored and retained for relatively long periods of time without appreciable loss of activity if it is maintained in a suitable solvent, typically the same solvent as was employed for the sulfiding. It is most convenient and best results are obtained, however, when the reductive treatment immediately follows the sulfiding operation.

In the reductive treatment a nickel soap is reduced with hydrogen and uniformly deposited on the support material. Useful nickel soaps for this purpose are derived from any of the previously described carboxylic acids, however, most generally a soap of a $C_{8-18}$ secondary or tertiary monocarboxylic acid will be used. It is not necessary that the same nickel soap and/or hydrocarbon that was used in the preceding step(s) in the catalyst preparation be used for the reductive treatment, however, in the usual practice of the invention the same soap and hydrocarbon are employed for all the various operations involved in the preparation of a particular supported catalyst. Also, the ratio of support:hydrocarbon can be the same or different. The amount of nickel soap employed is calculated to give the desired weight percent nickel in the final catalyst. In addition to the use of pure hydrogen, the hydrogen can be combined with an inert gas for the reduction. The reduction is generally carried out in an agitated autoclave at a temperature from about 100° C. up to about 200° C. and at a pressure of 10 to 500 psig.

It is generally advantageous to include compounds known to promote reduction. Such promoters are known and have been described in Canadian Pat. No. 632,785 and in other references. With the use of these promoters, the production of supported nickel catalysts having very high specific surface areas is possible. Useful promoters include hydroquinone and substituted hydroquinones, anthraquinine and substituted anthraquinones, naphthoquinone and substituted naphthoquinones, dextrose, gum arabic, propyl galate, tocopherols, pyrogallol, tannic acid and the like. These compounds when present at a concentration from about 2% to about 28%, based on the dry weight of the support material, facilitate the reduction and make it possible to obtain highly useful catalysts having small nickel crystallite size, e.g. high nickel surface areas. Hydroquinones, anthroquinones and naphthoquinines are particularly useful promoters for use in the preparation of the improved supported nickel catalysts of this invention, especially if employed in the preferred range of 2.5% to 25%. t-Butyl hydroquinone and 1,4-naphthoquinone are especially advantageous in view of their commercial availability.

When the nickel soap is essentially completely reduced, as evidenced by a marked reduction or cessation in hydrogen uptake, the reactor and its contents are cooled to room temperature, the system depressurized and discharged. The supported nickel catalyst is generally recovered by filtration followed by washing with a paraffinic solvent. Care should be taken to avoid excessive contact with air and/or moisture during the filtering and washing operation as this will reduce the catalyst activity. In the preferred form of this invention the catalyst is then dried to obtain a free-flowing powder. Drying can be accomplished in many ways but generally it is carried out under vacuum using a rotary evaporator at a temperature sufficiently high to flash off the solvent. Supported nickel catalysts in flake form can also be obtained by combining the wet catalyst filter cake with a saturated vegetable oil, heating under vacuum to remove the hydrocarbon solvent, and then cooling on a flaker roll.

The supported nickel catalysts of this invention contain from 25% to 75% by weight nickel and have a surface area between 100 $m^2/g$ and 800 $m^2/g$. More usually they will contain from about 35% to about 65% nickel and, in their preferred form, are free-flowing powders. The catalysts have finely divided nickel deposited thereon and they have substantially the same pore structure as the starting support material since the support material is generally not subject to chemical or thermal degradation during the deposition and reduction of nickel. They are further characterized by having nickel surface areas of about 25 to 100 $m^2/g$ and, more generally 30 to 90 $m^2/g$.

The supported nickel catalysts of this invention are useful in a variety of applications where supported nickel catalysts have heretofore been employed. They are particularly advantageous for use in hydrogenation procedures and especially for the hydrogenation of fatty materials, such as fats and oils and components thereof. The present catalysts are resistant to poisoning and they can be utilized for the hydrogenation of multiolefinic materials, it is possible to selectively hydrogenate specific olefinic sites to the virtual exclusive of other unsaturation present in the molecule. For example, polyunsaturated acids, such as linolenic acid, can be partially hydrogenated to the monounsaturated acid (oleic acid) without forming appreciable amounts of the completely saturated acid (stearic acid). This is possible with this invention since the pore size and other desirable structural characteristics of the support material necessary to achieve such selectivity are preserved as a result of the mild process conditions employed for the preparation of the nickel-supported catalyst.

These and other features of the invention are more fully illustrated in the examples which follow. In these examples, all parts and percentages are on a weight basis unless otherwise indicated.

EXAMPLE I (A) Preparation of Nickel Soap: To a solution of 462 g saturated tertiary monocarboxylic acid (Versatic® 10 acid) and 1038 g of isoparaffinic naphtha (boiling range 175°–195° C.) was added 124.5 g of 49.1% aqueous sodium hydroxide solution. The solution was stirred for ½ hour and 380 mls nickel nitrate solution (118 g Ni/liter) added and vigorously agitated for 10 minutes at 140° C. The aqueous and organic phases were separated and the organic phase contacted with an additional 100 mls of the nickel nitrate solution. Following separation of the phases the organic layer was filtered to remove minor quantities of sludge and water droplets. The resulting solution containing 2.52 g Ni per 100 g solution was identified as I(A).

(B) Preparation of Nickel-bearing Support: Fifty grams silica gel (Davison Grade 951), neutralized to pH 6.5 by contacting with sodium soap of the $C_{10}$ tertiary monocarboxylic acid, was slurried in 150 g isoparaffinic naphtha and 48 g of nickel soap solution I(A) added with agitation. After about twenty minutes essentially all of the nickel was adsorbed on the support as evidenced by the disappearance of the green color from the solution. The nickel-bearing support obtained after filtration contained 2.5% adsorbed nickel and was identified as I(B).

(C) Sulfiding: Nickel-bearing support I(B) was reslurried in 150 g fresh isoparaffinic naphtha and charged to a sulfiding apparatus. The apparatus consisted of a reactor fitted with a condenser, thermometer, subsurface gas bubbler connected to a hydrogen sulfide reservoir and means for recirculating gases from the top of the condenser back into the reaction mixture. The system was purged with nitrogen and an amount of hydrogen sulfide calculated to convert 33% of the adsorbed nickel to nickel sulfide introduced maintaining a temperature of 23° C. and a maximum pressure of 7-8 psig. Unreacted hydrogen sulfide was recirculated through the reaction mixture. During the final hour of reaction the temperature was increased to 100° C. The reactor was then cooled to ambient temperature while maintaining gas circulation and the nickel-sulfide-containing support (identified as I(C)) recovered.

(D) Reductive Treatment: Ten grams (dry weight) of sulfided support I(C) was slurried in a small amount of isoparaffinic naphtha and transferred to a 1-liter autoclave equipped with an agitator with 0.5 g 1,4-naphthoquinone and 397 g of the nickel soap solution I(A). After purging, heating was commenced and at 140° C. the autoclave was pressurized to 200 psig with hydrogen. When the temperature reached 190° C. there was no additional hydrogen uptake and the reaction was terminated. The reactor was cooled, depressurized and the catalyst recovered by filtration, washed with solvent and dried. The free-flowing supported catalyst (total surface area 600–630 $m^2/g$) had 45–47% bound nickel with a nickel surface area of 58.4 $m^2/g$. The surface area of nickel on the support was determined by x-ray diffraction from the crystallite dimension in accordance with the procedure described in "Physical and Chemical Aspects of Adsorbents and Catalysts", edited by B. G. Linsen, Academic Press (1970) at pages 497–8. The supported nickel catalyst was an effective catalyst for the hydrogenation of unsaturated fats and oils.

EXAMPLE II

To demonstrate the versatility of the process a 10 g sample (dry weight) of sulfided support I(C) slurried in approximately 30 mls isoparaffinic naphtha was retained for 21 hours before reductive treatment in accordance with step (D) of Example I. A highly effective supported catalyst having a nickel surface area of 55.3 $m^2/g$ was obtained.

EXAMPLE III

To further demonstrate the ability to store the sulfided support prior to reductive treatment, ten grams of the nickel-sulfide containing support obtained from step (C) of Example I was allowed to stand exposed to the atmosphere for twenty-six hours before reductive treatment. The sulfided support was then reduced in accordance with step (D) of Example I. The resulting supported catalyst had a nickel surface area of 53.9 $m^2/g$. The activity of this catalyst was comparable to that obtained with the supported nickel catalyst of Example I.

EXAMPLE IV

A series of three experiments was conducted to further demonstrate the ability to vary the procedure for preparing the supported catalysts. For these experiments a nickel-bearing support prepared identically to I(B) was employed. The amount of hydrogen sulfide used for the sulfiding operation was varied, however, in order to achieve 23%, 43% and essentially 100% conversion of adsorbed nickel to nickel sulfide. The sulfiding procedure and subsequent reductions were conducted in accordance with the procedures of Example I. Useful supported nickel catalysts having high total surface areas and nickel surface areas of 60 $m^2/g$, 50.8 $m^2/g$ and 50.1 $m^2/g$, respectively, were obtained.

EXAMPLE V

The necessity of sulfiding the nickel-bearing support prior to reductive treatment is demonstrated by the following example wherein a nickel-bearing support prepared identically to I(B) was reduced following procedure (D) of Example I. Note that the sulfiding step was omitted. The resulting product had significantly reduced nickel surface area (20.1 $m^2/g$) and proved to be greatly inferior as a catalyst for hydrogenation of fats and oils. The catalyst had much reduced activity and exhibited greater susceptibility to poisoning.

EXAMPLE VI

Example I was repeated except that in step (C) the temperature was maintained at 23° C. throughout the entire sulfiding operation. The resulting supported nickel catalyst had a nickel surface area of 65.3 $m^2/g$.

EXAMPLE VII

A series of catalysts were prepared in accordance with Example I varying the amount of nickel soap solution in step (B). Also, in the sulfiding step only 23% of the adsorbed nickel was converted to nickel sulfide and the temperature of the sulfiding operation was maintained at 23° C. throughout. The table below shows the amount of nickel adsorbed on the nickel-bearing support and the nickel surface area obtained for the resulting supported catalyst.

| % Nickel Adsorbed | Nickel Surface Area (m$^2$/g) |
|---|---|
| 2.4 | 53.9 |
| 2.0 | 58.2 |
| 1.5 | 56.0 |
| 1 | 46.3 |

EXAMPLE VIII

The procedure of Example I was repeated except that the amount of 1,4-naphthoquinone promoter used for the reduction was varied. For all of these reactions, 23% nickel was converted to nickel sulfide and the temperature was maintained at 23° C. throughout the sulfiding step. Useful catalysts were obtained in all instances, however, it is evident from the data reported in the table below that the presence of promoter results in higher nickel surface areas being obtained. In the table the amount of 1,4-naphthoquinone is reported as the percent of nickel reduced.

| Percent 1,4-naphthoquinone | Nickel Surface Area (m$^2$/g) |
|---|---|
| 0 | 43.9 |
| 2.5 | 56.7 |
| 5 | 65.3 |
| 25 | 68.4 |

EXAMPLE IX

Example I was repeated except that in step (D) t-butyl hydroquinone was substituted for the 1,4-naphthoquinone. The reduction proceeded without difficulty and a useful catalyst having a total surface area of about 610 m$^2$/g and a nickel surface area of 47.9 m$^2$/g was obtained.

EXAMPLE X

The catalyst preparation of Example I was repeated except that the reduction was carried out at a pressure of 75 psig. The resulting supported nickel catalyst had a nickel surface area of 56.7 m$^2$/g.

EXAMPLE XI

Example I was repeated except that the reduction was carried out at a pressure of 400 psig. The resulting free-flowing supported catalyst contained about 45% bound nickel with a nickel surface area of about 57 m$^2$/g.

EXAMPLE XII

To demonstrate the ability to use other support materials and to vary the amount and type of nickel soap in the catalyst preparation, a supported nickel catalyst was prepared as follows: Two-hundred grams synthetic hydrous calcium silicate (surface area of 175 m$^2$/g) was slurried in 1300 g of a solution of isoparaffinic naphtha and nickel soaps of mixed $C_{9-11}$ saturated monocarboxylic acids (8.75 g Ni/liter). The mixture was agitated at room temperature for one hour and then at 105° C. for an additional hour. The support was then filtered, washed with additional solvent, and sulfided to convert approximately 23% of the adsorbed nickel to hydrogen sulfide. The nickel sulfide containing support (56.1 g) was reduced at 200 psig and 189° C. in the presence of 36.9 g of the nickel soap solution of mixed $C_{9-11}$ acids and 1.08 g 1,4-naphthoquinone. The supported nickel catalyst had a surface area of 73 m$^2$/g and was an effective catalyst for the hydrogenation of fats and oils. For example, when used in the hydrogenation of soya oil (0.05% nickel based on the oil) at a temperature of 185° C. and pressure of 40 psig, the iodine value of the oil was reduced from 72 to less than 2 in less than 1½ hours.

EXAMPLE XIII

Nickel soap of neodecanoic acid was slurried in isoparaffinic naphtha (5.4% Ni) and 44.4 g of this slurry combined with 100 g silica gel (alkali washed to a pH of about 6.5) and 290 g isoparaffinic naptha. The mixture was agitated for 30 minutes, filtered and the support having nickel adsorbed thereon reacted with hydrogen sulfide as in Example I at room temperature so that approximately 33% of the nickel was converted to nickel sulfide. Sixteen grams of the sulfided support (washed and filtered) was charged to an autoclave with 296 g of the nickel soap solution of neodecanoic acid and a small amount of 1,4-naphthoquinone promoter. Hydrogen was introduced to a pressure of 200 psig and the reaction mixture heated with agitation to 192° C. until there was no further hydrogen uptake. The supported nickel catalyst (50% Ni) was worked up in the usual manner and had a surface area of 51.3 m$^2$/g.

EXAMPLE XIV

To demonstrate the ability to obtain high nickel loading on a silica gel support, a catalyst was prepared in a manner similar to that already described. For the catalyst preparation the nickel soap solution contained 2.54% Ni and the nickel soap was derived from neodecanoic acid. The preparation of nickel-bearing support and the sulfiding operation were identical to steps (B) and (C) of Example I. For the reduction, however, 6 g of the sulfided support was combined with 709 g of the nickel soap solution and 1.2 g 1,4-naphthoquinone. The resulting supported nickel catalyst, containing about 75 wt. % bound nickel with a nickel surface area of about 49 m$^2$/g, was an effective hydrogenation catalyst.

EXAMPLE XV

Employing procedures identical to those described in steps (B) and (C) of Example I, except that the nickel soap solution contained 5.0% nickel, a nickel sulfide-containing support was prepared. The sulfided support (22.8 g) was combined with 268 g of the nickel soap solution and 0.8 g 1,4-naphthoquinone and reduced following the customary procedure. The supported nickel catalyst (37% Ni) had a nickel surface area of 55.3 m$^2$/g. This catalyst was used for the hydrogenation of isomerized $C_{18}$ fatty acids having an iodine value of 67.6. For the hydrogenation 700 g of the unsaturated acids were combined with 10 g of the catalyst and 10.5 g activated montmorillonite clay in a 2 liter reactor. The reactor was pressurized to 200 psig with hydrogen at a temperature of 140° C. and heated to 245° C. over a 2 hour period with agitation during which time the iodine value was reduced to 18.8.

EXAMPLE XVI

To demonstrate the use of still other support materials for the preparation of useful nickel catalysts by the process of this invention, 40 g activated carbon was slurried in 300 g inert paraffinic hydrocarbon with 15.6 g of a nickel soap solution (6.51% Ni) derived from $C_{9-11}$ mixed tertiary saturated aliphatic monocarboxylic acids. The mixture was agitated to achieve adsorption of nickel on the support and the resulting nickel-bearing support, containing 1.9% Ni, was treated with hydrogen sulfide to convert approximately 50% of the nickel to nickel sulfide. Eight grams (dry weight) of the sulfided material was combined with 125 g of the nickel soap solution and reduced with hydrogen at 200 psig and 185° C. for 15 minutes. The resulting supported catalyst contained about 50 wt. % nickel, had a high nickel surface area and was an effective catalyst for the hydrogenation of unsaturated fatty materials.

We claim:

1. A process for the preparation of improved supported nickel catalysts comprising:
   (a) contacting a nickel soap of an aliphatic monocarboxylic acid having from 2 to 22 carbon atoms with an inorganic support having a surface area greater than 50 m²/g at a temperature from 0° C. to 250° C. in an inert aliphatic hydrocarbon diluent having a boiling point greater than 90° C. to obtain a nickel-bearing support;
   (b) sulfiding the resulting nickel-bearing support to convert at least 1% of the nickel associated therewith to nickel sulfide; and
   (c) reducing in the presence of additional nickel soap.

2. The process of claim 1 comprising the additional steps of removing the hydrocarbon diluent and drying the nickel supported catalyst under vacuum at an elevated temperature and in the substantial absence of air and moisture to obtain a free-flowing powder.

3. The process of claim 1 wherein the diluent is a saturated aliphatic hydrocarbon boiling in the range 100° C. to 350° C., the nickel soap is derived from a secondary or tertiary saturated aliphatic monocarboxylic acid having from 6 to 18 carbon atoms and the inorganic support has a surface area from about 100 m²/g.

4. The process of claim 3 wherein the sulfiding is conducted at a temperature from about 0° C. to 200° C. by intimately contacting the nickel-bearing support with hydrogen sulfide in the substantial absence of oxygen.

5. The process of claim 4 wherein hydrogen is the reducing agent and the reduction is carried out at a temperature from 100° C. to 200° C. and pressure of 10 to 500 psig in the presence of a promoter selected from the group consisting of hydroquinones, anthraquinones and naphthoquinones.

6. The process of claim 3, 4 or 5 wherein the nickel-bearing support has from about 1.0% to 2.75% by weight nickel associated therewith and 10% to 50% of said associated nickel is converted to nickel sulfide during the sulfiding operation.

7. The process of claim 6 wherein the hydrocarbon diluent is selected from the group consisting of mineral oil, mineral seal oil, liquid petrolatum and liquid paraffin and contains 0.1 wt. % to 50 wt. % of the support material.

8. The process of claim 7 wherein the nickel soap is derived from a $C_{9-16}$ tertiary acid or mixtures thereof and the promoter is 1,4-naphthoquinone.

* * * * *